US008982833B2

(12) United States Patent
Kroener et al.

(10) Patent No.: US 8,982,833 B2
(45) Date of Patent: Mar. 17, 2015

(54) COMMUNICATION RESOURCE ALLOCATION STRATEGY

(75) Inventors: Hans Kroener, Geislingen-Weiler (DE); Daniela Laselva, Klarup (DK); Frank Frederiksen, Klarup (DK); Wolfgang Payer, Ulm (DE); Carsten Ball, München (DE); Ralf Golderer, Leinfelden-Echterdingen (DE)

(73) Assignee: Nokia Siemens Networks Oy, Espoo (FI)

( * ) Notice: Subject to any disclaimer, the term of this patent is extended or adjusted under 35 U.S.C. 154(b) by 646 days.

(21) Appl. No.: 13/262,537

(22) PCT Filed: Apr. 3, 2009

(86) PCT No.: PCT/EP2009/054051
§ 371 (c)(1),
(2), (4) Date: Nov. 28, 2011

(87) PCT Pub. No.: WO2010/112086
PCT Pub. Date: Oct. 7, 2010

(65) Prior Publication Data
US 2012/0063413 A1      Mar. 15, 2012

(51) Int. Cl.
*H04W 4/00*   (2009.01)
*H04W 72/04*  (2009.01)
*H04W 72/12*  (2009.01)
*H04W 88/08*  (2009.01)

(52) U.S. Cl.
CPC .............. *H04W 72/04* (2013.01); *H04W 72/12* (2013.01); *H04W 88/08* (2013.01)
USPC .......................................................... 370/330

(58) Field of Classification Search
USPC ................................ 370/330, 254, 458; 455/7
See application file for complete search history.

(56) References Cited

U.S. PATENT DOCUMENTS

| 2002/0150074 | A1 | 10/2002 | Hayashi et al. ................ 370/342 |
| 2004/0203822 | A1 | 10/2004 | Vitebsky .................... 455/452.1 |
| 2009/0046650 | A1* | 2/2009 | Dalsgaard et al. ............ 370/329 |

(Continued)

FOREIGN PATENT DOCUMENTS

| EP | 1 411 685 A2 | 4/2004 |
| EP | 1 838 012 A1 | 9/2007 |

OTHER PUBLICATIONS

3GPP TS 36.211 V8.6.0 (Mar. 2009), Technical Specification, $3^{rd}$ Generation Partnership Project; Technical Specification Group Radio Access Network; Evolved Universal Terrestrial Radio Access (E-UTRA); Physical Channels and Modulation (Release 8), (83 pages).

(Continued)

*Primary Examiner* — Phuongchau Ba Nguyen
(74) *Attorney, Agent, or Firm* — Harrington & Smith

(57) ABSTRACT

A scheduling processor allocates a time slot of a communication protocol to a user equipment for data transmission based on received control data of the same or another user equipment in a current time slot and received user data of the same or another user equipment in a preceding time slot, while ignoring user data of the same or any other user equipment received in the current time slot. The scheduling processor also allocates a frequency resource to the user equipment. A control channel managing processor allocates signaling resources on a control channel for the submission of control information to the user equipment, which informs of the time slot allocated by the time domain scheduling processor as well as of the frequency resource allocated by the frequency domain scheduling processor.

28 Claims, 6 Drawing Sheets

(56) References Cited

U.S. PATENT DOCUMENTS

2010/0085927 A1* 4/2010 Torsner et al. ............... 370/329
2012/0063413 A1* 3/2012 Kroener et al. ............... 370/330

OTHER PUBLICATIONS

3GPP TS 36.212 V8.6.0 (Mar. 2009), Technical Specification, 3$^3$ Generation Partnership Project; Technical Specification Group Radio Access Network; Evolved Universal Terrestrial Radio Access (E-UTRA); Multiplexing and Channel Coding (Release 8), (59 pages).

3GPP TS 36.213 V8.6.0 (Mar. 2009), Technical Specification, 3$^r$ Generation Partnership Project; Technical Specification Group Radio Access Network; Evolved Universal Terrestrial Radio Access (E-UTRA); Physical Layer Procedures (Release 8), (77 pages).

* cited by examiner

Table 9.1.1-1: PDCCH candidates monitored by a UE.

| Type | Search space $S_k^{(L)}$ Aggregation level $L$ | Size [in CCEs] | Number of PDCCH candidates $M^{(L)}$ | DCI formats |
|---|---|---|---|---|
| UE-specific | 1 | 6 | 6 | 0, 1, 1A, 1B, 2 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

COMMUNICATION RESOURCE ALLOCATION STRATEGY

FIELD OF THE INVENTION

The present invention relates to an apparatus, method, system and computer program product for providing a communication resource allocation strategy.

RELATED BACKGROUND ART

Prior art which is related to this technical field can e.g. be found by the technical specifications TS 36.211 current version: 8.6.0), TS 36.212 (current version 8.6.0) and TS 36.213 (current version: 8.6.0) of the 3GPP.

The following meanings for the abbreviations used in this specification apply:
3GPP: 3$^{rd}$ Generation Partnership Project
ASIC: Application Specific Integrated Circuit
BLER: Block Error Rate
BTS: Base Transceiver Station
CCE: Control Channel Element
CQI: Channel Quality Indicator
DL: Downlink
DSP: Digital Signal Processor
eNB: evolved Node B (eNode B)
FD: Frequency Domain
FDD: Frequency Division Duplex
FEC: Forward Error Coding
GSM: Global System for Mobile Communication
HARQ: Hybrid Automatic Repeat Request
HW: Hardware
LA: Link Adaptation
LTE: Long Term Evolution
OFDMA: Orthogonal Frequency Division Multiple Access
PDCCH: Physical Downlink Control Channel
PDSCH: Physical Downlink Shared Channel
PHICH: Physical Hybrid Indicator Channel
PRB: Physical Resource Block
PS: Packet Scheduler
PUCCH: Physical Uplink Control Channel
PUSCH: Physical Uplink Shared Channel
QoS: Quality of Service
RE: Resource Element
RNTI: Radio Network Temporary Identifier
SC-FDMA: Single Carrier Frequency Division Multiple Access
SRB: Signaling Radio Bearer
SW: Software
TD: Time Domain
TDD: Time Division Duplex
TTI: Transmission Time Interval
UE: User Equipment
UL: Uplink
WCDMA: Wideband Code Division Multiple Access
WiMAX: Worldwide Interoperability for Microwave Access In recent years, 3GPP's LTE as the upcoming standard is under particular research. The base station of LTE is called eNodeB. LTE will be based on OFDMA in downlink and SC-FDMA in uplink. Both schemes allow the division of the uplink and downlink radio resources in frequency and time, i.e., specific frequency resources will be allocated for certain time duration to the different UE. The access to the uplink and downlink radio resources is controlled by the eNode B, more specifically by the uplink and downlink schedulers that control the allocation of the frequency resources for certain time slots. A time slot is called sub-frame in the LTE specifications.

The concrete resource allocation has to be signaled to the different UE such that these know in which downlink frequencies they can receive the downlink data and on which uplink frequencies they can send their uplink data. The actual data are then transmitted over the PDSCH or the PUSCH, respectively. In addition to this also other information like the used modulation and coding scheme has to be signaled to the UE. This is done via the PDCCH. Here, input information is control information that is sent in uplink over the PUCCH or multiplexed control data that is sent over the PUSCH.

Specifically, the eNB decides before sub-frame n how the UE allocation in downlink and uplink shall be and sends this allocation in the same sub-frame n over the PDCCH to the different UE, while actual uplink transmissions are sent in a later time slot. At the same time, the information whether the previous uplink data block has been received correctly by the eNB or not will be sent over the PHICH. Following this transmission of the PDCCH, the downlink user data is sent to the scheduled UE also in sub-frame n over the allocated frequencies. Then each UE will decode the allocation and the corresponding downlink user data. The uplink user data will then be sent in sub-frame n+4 according to the allocation that has been done by the eNB in sub-frame n (see document TS 36.213). The time delay of 4 sub-frames takes propagation and processing delays into account. While this applies to the FDD mode of LTE, other time delays apply for different TDD configurations.

The scheduling of the user data as well as the allocation of the control resources is ideally done as shown in FIG. 1 illustrating an ideal scheduling/PDCCH management scheme. Specifically, this scheme may use the following steps to decide which UE will be scheduled to the corresponding allocations on the PDCCH and allocate the frequency resources:

Step 1: Downlink and uplink time domain schedulers select a subset of UE that should get downlink and uplink resources to transmit their data. The decision will be based on quality of service aspects, data availability, pending HARQ retransmissions etc. Therefore, this information needs to be available at this point of time.

Step 2: Allocation of signaling resources on PDCCH by the PDCCH manager. This step evaluates the needed modulation (depending on e.g. LTE release) and coding format, transmission power and the allocation of the corresponding signaling resources. This allocation will also take into account the QoS and the HARQ status of the corresponding UE. Since the UE will only be able to decode this signaling information for a limited search range of the PDCCH channel, there is a risk of blocking of some of the UEs that should get allocated according to the TD scheduler. Those will then be postponed to the next available scheduling instant. However, the UEs that have uplink HARQ retransmissions should preferably get resources, since LTE uses a synchronous uplink HARQ mode, and a missed scheduled retransmission will cause an additional retransmission delay of 8 ms (for FDD mode). Therefore, these UL retransmissions will be allocated with higher priority. This steps needs to be handled before the final allocation of resources on the PDSCH/PUSCH.

Step 3: Downlink and uplink frequency domain schedulers allocate the frequency resources for the different UE on PDSCH and PUSCH, respectively.

As a further aspect, according to document TS 36.211, in LTE the PDCCH carries UE-specific control information to each scheduled UE both in uplink, i.e. UL grant, and downlink direction, i.e. DL scheduling assignment, each TTI, i.e. time slot. The PDCCH is mapped onto a set of RE or similarly onto one or more control channel elements (CCEs), where 1 CCE=36 RE in up to the first three OFDM symbols of a TTI (2-4 OFDM symbols are permitted for a system bandwidth of 1.4 MHz). Given a certain system bandwidth and a defined number of OFDM symbols to be used for PDCCH transmissions, the total amount of available CCE is known. An example number of CCE available for dynamic scheduling for a 10 MHz configuration would be 10, 27, and 43 CCE for 1, 2, and 3 OFDM symbols for control, respectively. While the packet scheduler decisions are taken independently for UL and DL as they assign UL and DL resources, respectively, the allocation of the common control resources by the PDCCH scheduler needs to be performed jointly for UL and DL. The number of allocated CCE, i.e. the CCE aggregation level, for different UE depends on the dynamically estimated channel conditions of the target UE, hence a link adaptation algorithm is used on PDCCH to select the dynamic aggregation level per user. At present, it is considered that the packet scheduler will be able to perform the decisions on the scheduling of different users jointly (see FIG. 1).

Specifically, an eNB as the LTE base station has not only to signal the corresponding allocation for UL and DL to all scheduled UE on the PDCCH per TTI. In addition, also broadcast, paging and other common signaling is to be transmitted. In order to comply with these tasks, the PDCCH is partitioned into a common search space (CSS) and a UE specific search space (USS). Every active UE in the cell listens to the PDCCH. In this context, an active UE is covering the UE that are in active mode, while at the same time has a discontinuous reception (DRX) pattern that allows for decoding of the PDCCH. Though, a UE listens only on specific search positions according to its hashing function, which relies on either the cell-specific or semi-persistent RNTI, and to a sub-frame number and the aggregation selected for the message. An aggregation defines the code-rate selected for the message, which is derived from CQI/radio quality measurements such that typically a target of 1% BLER is maintained. Unfortunately, the higher the aggregation, the lower is the number of potential search positions on the PDCCH. There are aggregations 1, 2, 4 and 8 possible with six potential search positions, six potential search positions, two potential search positions, and two potential search positions, respectively, on PDCCH available.

By referring again to FIG. 1, the UL and DL TD PS output independent sub-sets of prioritized UL and DL users, respectively. Before UL and DL frequency domain PS can define the final list of scheduled UE and independently perform the PRB allocation, the downlink control channel resource scheduler needs to perform the following:

1) Determining the Number of Needed OFDM Symbols (1-3) for Control

Several alternatives are possible, e.g., from semi-static allocation to a dynamic PDCCH symbol allocation to optimize the trade-off between data transmitted and control overhead. As output of this step the total amount of CCE available for dynamic scheduling is known.

2) Share the CCE Dynamically Between UL and DL Scheduled UE

This step may potentially limit the number of UEs who can be scheduled in the next TTI due to control channel resource limitations, but should target to share in a relative fair manner the control resources for the two link directions. In this connection, also certain QoS aspects need to be considered, i.e. if one direction has more QoS traffic than the other one. In such a case, it potentially needs more resources. In addition, the UL typically needs more PDCCH resources, since more UE need to be scheduled per sub-frame than in DL due to the fact that the UE power is much smaller than the eNode B power. Furthermore, for certain TDD configurations, some sub-frames will be DL only, while others in contrast will potentially favor UL allocations more, as the next UL scheduling opportunity happens much later.

3) Map Each UE to the Proper Aggregation and Power Boosting Level, while Still Satisfying the BLER Target for the PDCCH This step should be performed applying hashing-functions as defined in the respective standard specifications.

In the steps above where the eNB scheduler have to assign CCE resources for a given scheduled UE, the eNB will have to take the UE's search space into consideration. As described above, the search space defines a set of search positions that the UE will investigate for scheduling information intended for it. FIG. 2 shows a table describing the positions of the search space as defined by Table 9.1.1-1 of document TS 36.213.

Specifically, according to document TS 36.213, a control region consists of a set of CCEs, numbered from 0 to $N_{CCE,k}-1$, where $N_{CCE,k}$ is the total number of CCEs in the control region of subframe k. The UE shall monitor a set of PDCCH candidates for control information in every non-DRX sub-frame, where monitoring implies attempting to decode each of the PDCCHs in the set according to all the monitored DCI formats. The set of PDCCH candidates to monitor are defined in terms of search spaces, where a search space $S_k^{(L)}$ at aggregation level $L \in \{1,2,4,8\}$ is defined by a set of PDCCH candidates. The CCEs corresponding to PDCCH candidate m of the search space $S_k^{(L)}$ are given by $L \cdot \{(Y_k+m) \mod \lfloor N_{CCE,k}/L \rfloor\}+i$, where $Y_k$ is defined below, $i=0, \ldots, L-1$ and $m=0, \ldots, M^{(L)}-1$. $M^{(L)}$ is the number of PDCCH candidates to monitor in the given search space. The UE shall monitor one common search space at each of the aggregation levels 4 and 8 and one UE-specific search space at each of the aggregation levels 1, 2, 4, 8. The common and UE-specific search spaces may overlap. The aggregation levels defining the search spaces are listed in Table 9.1.1-1 of document TS 36.213, shown in FIG. 2. The DCI formats that the UE shall monitor depend on the configured transmission mode. For the common search spaces, $Y_k$ is set to 0 for the two aggregation levels L=4 and L=8. For the UE-specific search space $S_k^{(L)}$ at aggregation level L, the variable $Y_k$ is defined by $Y_k=(A \cdot Y_{k-1}) \mod D$, where $Y_{-1}=n_{RNTI} \neq 0$, A=39827, D=65537 and $k=\lfloor n_s/2 \rfloor$, $n_s$ is the slot number within a radio frame. The RNTI value used for $n_{RNTI}$ is defined differently for downlink and uplink.

The UE specific search space defines search positions that will be scattered at 'random' positions, while the common search space is well-defined and common for all UE monitoring the PDCCH.

FIG. 3 illustrates the PDCCH common search space (boxes filled with horizontal lines) which is common for all UE monitoring the PDCCH and an example of a user specific search space (boxes with diagonal lines). From top to bottom, the respective four rows represent aggregation level 8, 4, 2 and 1, respectively.

SUMMARY OF THE INVENTION

It is an object of the present invention to provide a communication resource allocation strategy.

According to a first aspect of the present invention, this is accomplished by an apparatus, comprising a scheduling processor configured to allocate a time slot of a communication protocol to a user equipment for data transmission based on received control data of the same or another user equipment in a current time slot and received user data of the same or another user equipment in a preceding time slot, while ignoring user data of the same or any other user equipment received in the current time slot, and to allocate a frequency resource to the user equipment; and a control channel managing processor configured to allocate signaling resources on a control channel for the submission of control information to the user equipment, which informs of the time slot allocated by the time domain scheduling processor as well as of the frequency resource allocated by the frequency domain scheduling processor.

Modifications of the first aspect may be as follows.

The apparatus according to the first aspect may be configured to be suitable for providing a communication resource allocation strategy.

The scheduling processor may comprise a time domain scheduling processor configured to allocate the time slot and a frequency domain scheduling processor configured to allocate the frequency resource.

The frequency domain scheduling processor may be further configured to allocate the frequency resource within the time slot allocated by the time domain scheduling processor.

The apparatus may comprise an error control processor configured to determine correct receipt of user data transmitted by the same or another user equipment and to respectively confirm a status of the correct receipt of user data to the same or the another user equipment.

The scheduling processor may be further configured to allocate a time slot of a communication protocol to the user equipment for data transmission based on receipt of user data of the user equipment in a preceding time slot, which user data is determined by the error control processor to be incorrectly received.

The time domain scheduling processor may comprises a downlink time domain scheduling processor configured to allocate a downlink time slot of a communication protocol to a user equipment for data transmission and an uplink time domain scheduling processor configured to allocate an uplink time slot of a communication protocol to a user equipment for data transmission, the control data may be uplink control data and the user data may be uplink user data, the frequency domain scheduling processor may comprise a downlink frequency domain scheduling processor configured to allocate a downlink frequency resource within the allocated downlink time slot and an uplink frequency domain scheduling processor configured to allocate an uplink frequency resource within the allocated uplink time slot, the downlink frequency domain scheduling processor may be further configured to allocate the downlink frequency resource within the allocated downlink time slot in response to the allocation of signaling resources by the control channel managing processor, and the uplink frequency domain scheduling processor may be further configured to allocate the uplink frequency resource within the allocated uplink time slot in response to a completed receipt of uplink user data of the same or another user equipment received in the current time slot.

The uplink frequency domain scheduling processor may be further configured to determine whether the control channel managing processor allocated a signaling resource to the user equipment, but at the same time the downlink frequency domain scheduling processor did not allocate a downlink frequency resource within the allocated downlink time slot to the user equipment, to control removal of the signaling resource allocation, and to allocate the removed signaling resource as uplink frequency resource to the another user equipment.

The time domain scheduling processor may comprise a downlink time domain scheduling processor configured to allocate a downlink time slot of a communication protocol to a user equipment for data transmission and an uplink time domain scheduling processor configured to allocate an uplink time slot of a communication protocol to a user equipment for data transmission, the control data may be uplink control data and the user data may be uplink user data, the frequency domain scheduling processor may comprise a downlink frequency domain scheduling processor configured to allocate a downlink frequency resource within the allocated downlink time slot and an uplink frequency domain scheduling processor configured to allocate an uplink frequency resource within the allocated uplink time slot, the control channel managing processor may comprise a control channel downlink managing processor configured to allocate signaling resources on the control channel for the submission of downlink control information to the user equipment, which informs of the downlink time slot allocated by the downlink time domain scheduling processor as well as of the downlink frequency resource allocated by the downlink frequency domain scheduling processor, and a control channel uplink managing processor configured to allocate signaling resources on the control channel for the submission of uplink control information to the user equipment, which informs of the uplink time slot allocated by the uplink time domain scheduling processor as well as of the uplink frequency resource allocated by the uplink frequency domain scheduling processor, the downlink time domain scheduling processor may be further configured to allocate the downlink time slot of a communication protocol to the user equipment for data transmission based on received control data of the same or another user equipment in a current time slot and received user data of the same or another user equipment in a preceding time slot, while ignoring user data of the same or any other user equipment received in the current time slot, the uplink time domain scheduling processor may be further configured to allocate the uplink time slot of a communication protocol to the user equipment for data transmission in response to a completed receipt of uplink user data of the same and any other user equipment received in the current time slot, the control channel downlink managing processor may be further configured to allocate signaling resources on the control channel for the submission of downlink control information to the user equipment in response to the allocation of the downlink time slot by the downlink time domain scheduling processor, the control channel uplink managing processor may be further configured to allocate signaling resources on the control channel for the submission of uplink control information to the user equipment in response to the allocation of the uplink time slot by the uplink time domain scheduling processor, the downlink frequency domain scheduling processor may be further configured to allocate the downlink frequency resource within the allocated downlink time slot in response to the allocation of signaling resources by the control channel downlink managing processor, and the uplink frequency domain scheduling processor may be further configured to allocate the uplink frequency resource within the allocated uplink time slot in response to the allocation of signaling resources by the control channel uplink managing processor.

The apparatus may further comprise an error control processor configured to determine correct receipt of uplink user data transmitted by the user equipment and to confirm a status of the correct receipt of the uplink user data to the user equipment, wherein the control channel downlink managing processor is further configured to reserve signaling resources on the control channel for the submission of control information to the user equipment concerning a retransmission of the uplink user data for the case that the uplink user data is determined by the error control processor to be incorrectly received.

The control channel managing processor and the frequency domain scheduling processor may be further configured to be in operable connection with each other, the control channel managing processor may be further configured to allocate signaling resources on the control channel to the user equipment before the frequency domain scheduling processor can allocate a frequency resource to the user equipment, and the frequency domain scheduling processor may be further configured to skip allocation of a frequency resource to the user equipment if no signaling resources on the control channel are allocated by the control channel managing processor to the user equipment.

The apparatus may further comprise an error control processor configured to determine correct receipt of user data transmitted by the user equipment and to confirm a status of the correct receipt of the user data to the user equipment, wherein the control channel managing processor may be further configured to map the control channel for the submission of control information to the user equipment onto a plurality of control channel elements, the plurality of control channel elements may be separated into a user equipment specific search space comprising such control channel elements carrying control information which is specific for read-out by the user equipment and into a common search space comprising such control channel elements carrying control information which can be commonly read-out by all user equipment listening to the control channel, and the control channel managing processor may be further configured to reserve a number of control channel elements in the common search space for the submission of control information to the user equipment concerning a retransmission of the uplink user data for the case that the uplink user data is determined by the error control processor to be incorrectly received.

An aggregation level may be defined by the combination of one or more control channel elements for carrying a related amount of interrelated control information, where a higher aggregation level designates more combined control channel elements, and the control channel managing processor may be further configured to select an aggregation level for the reservation in the common search space based on a data transmission history comprising one or more of a group including a number of user equipment to which resources were allocated in a selected preceding time slot, an aggregation level used for the submission of control information to the user equipment, and a power level used for the submission of control information to the user equipment.

The apparatus may further comprise a monitoring controller configured to monitor the number of control channel elements in the common search space for the submission of control information to the user equipment reserved by the control channel managing processor as well as the number of these reserved control channel elements in the common search space which are actually used, and to command the control channel managing processor to adapt the number of reserved control channels elements accordingly.

According to a second aspect of the present invention, this is accomplished by an apparatus, comprising means for allocating a time slot of a communication protocol to a user equipment for data transmission based on received control data of the same or another user equipment in a current time slot and received user data of the same or another user equipment in a preceding time slot, while ignoring user data of the same or any other user equipment received in the current time slot, and for allocating a frequency resource to the user equipment; and means for allocating signaling resources on a control channel for the submission of control information to the user equipment, which informs of the time slot allocated by the time domain scheduling processor as well as of the frequency resource allocated by the frequency domain scheduling processor. Modifications of the second aspect may correspond to the modifications of the first aspect.

According to a third aspect of the present invention, the above object is accomplished by a method, comprising allocating a time slot of a communication protocol to a user equipment for data transmission based on received control data of the same or another user equipment in a current time slot and received user data of the same or another user equipment in a preceding time slot, while ignoring user data of the same or any other user equipment received in the current time slot; allocating a frequency resource to the user equipment; and allocating signaling resources on a control channel for the submission of control information to the user equipment, which informs of the allocated time slot as well as of the allocated frequency resource.

Modifications of the third aspect may be as follows.

The method according to the third aspect may be configured to be suitable for providing a communication resource allocation strategy.

The allocating a time slot may be performed by a time domain scheduling processor, and the allocating a frequency resource may be performed by a frequency domain scheduling processor, while the allocating signaling resources may be performed by a control channel managing processor.

The allocating a frequency resource may include allocating a frequency resource within the allocated time slot.

The method may further comprise determining correct receipt of user data transmitted by the same or another user equipment; and respectively confirming a status of the correct receipt of user data to the same or the another user equipment.

The determining correct receipt may be performed by an error control processor.

The method may further comprise allocating a time slot of a communication protocol to the user equipment for data transmission based on receipt of user data of the user equipment in a preceding time slot, which user data is determined to be incorrectly received.

The allocating a time slot may comprise allocating a downlink time slot of a communication protocol to a user equipment for data transmission and allocating an uplink time slot of a communication protocol to a user equipment for data transmission, the control data may be uplink control data and the user data may be uplink user data, and the allocating a frequency resource may comprise allocating a downlink frequency resource within the allocated downlink time slot and allocating an uplink frequency resource within the allocated uplink time slot; the method may further comprise allocating the downlink frequency resource within the allocated downlink time slot in response to the allocating of signaling resources; and allocating the uplink frequency resource within the allocated uplink time slot in response to a completed receipt of uplink user data of the same or another user equipment received in the current time slot.

The allocating a downlink time slot may be performed by a downlink time domain scheduling processor, the allocating an uplink time slot may be performed by an uplink time domain scheduling processor, the allocating a downlink frequency resource may be performed by a downlink frequency domain scheduling processor and the allocating an uplink frequency resource may be performed by an uplink frequency domain scheduling processor.

The method may further comprise determining whether a signaling resource is allocated to the user equipment, but at the same time no downlink frequency resource within the allocated downlink time slot is allocated to the user equipment; controlling removal of the signaling resource allocation; and allocating the removed signaling resource as uplink frequency resource to the another user equipment.

This may be performed by the uplink frequency domain scheduling processor.

The allocating a time slot may comprise allocating a downlink time slot of a communication protocol to a user equipment for data transmission and allocating an uplink time slot of a communication protocol to a user equipment for data transmission, the control data may be uplink control data and the user data are uplink user data, the allocating a frequency resource may comprise allocating a downlink frequency resource within the allocated downlink time slot and allocating an uplink frequency resource within the allocated uplink time slot, and the allocating signaling resources may comprise allocating signaling resources on the control channel for the submission of downlink control information to the user equipment, which informs of the allocated downlink time slot as well as of the allocated downlink frequency resource, and allocating signaling resources on the control channel for the submission of uplink control information to the user equipment, which informs of the allocated uplink time slot as well as of the allocated uplink frequency resource; the method may further comprise allocating the downlink time slot of a communication protocol to the user equipment for data transmission based on received control data of the same or another user equipment in a current time slot and received user data of the same or another user equipment in a preceding time slot, while ignoring user data of the same or any other user equipment received in the current time slot; allocating the uplink time slot of a communication protocol to the user equipment for data transmission in response to a completed receipt of uplink user data of the same and any other user equipment received in the current time slot; allocating signaling resources on the control channel for the submission of downlink control information to the user equipment in response to the allocating of the downlink time slot; allocating signaling resources on the control channel for the submission of uplink control information to the user equipment in response to the allocating of the uplink time slot; allocating the downlink frequency resource within the allocated downlink time slot in response to the allocating of signaling resources; and allocating the uplink frequency resource within the allocated uplink time slot in response to the allocating of signaling resources.

The allocating signaling resources on the control channel for the submission of downlink control information may be performed by a control channel downlink managing processor, and the allocating signaling resources on the control channel for the submission of uplink control information may be performed by a control channel uplink managing processor.

The method may further comprise determining correct receipt of uplink user data transmitted by the user equipment; confirming a status of the correct receipt of the uplink user data to the user equipment; and reserving signaling resources on the control channel for the submission of control information to the user equipment concerning a retransmission of the uplink user data for the case that the uplink user data is determined to be incorrectly received.

The determining correct receipt may be performed by an error control processor.

The method may further comprise allocating signaling resources on the control channel to a second user equipment before allocating a frequency resource to the second user equipment, and skipping allocation of a frequency resource to the second user equipment if no signalling resources on the control channel are allocated to the second user equipment.

The method may further comprise determining correct receipt of user data transmitted by the user equipment; confirming a status of the correct receipt of the user data to the user equipment; mapping the control channel for the submission of control information to the user equipment onto a plurality of control channel elements, wherein the plurality of control channel elements is separated into a user equipment specific search space comprising such control channel elements carrying control information which is specific for read-out by the user equipment and into a common search space comprising such control channel elements carrying control information which can be commonly read-out by all user equipment listening to the control channel; and reserving a number of control channel elements in the common search space for the submission of control information to the user equipment concerning a retransmission of the uplink user data for the case that the uplink user data is determined to be incorrectly received.

The aggregation level may be defined by the combination of one or more control channel elements for carrying a related amount of interrelated control information, where a higher aggregation level designates more combined control channel elements; the method may further comprise selecting an aggregation level for the reserving in the common search space based on a data transmission history comprising one or more of a group including a number of user equipment to which resources were allocated in a selected preceding time slot, an aggregation level used for the submission of control information to the user equipment, and a power level used for the submission of control information to the user equipment.

The selecting an aggregation level may be performed by the control channel managing processor.

The method may further comprise monitoring the number of reserved control channel elements in the common search space for the submission of control information to the user equipment as well as the number of these reserved control channel elements in the common search space which are actually used; and commanding to adapt the number of reserved control channels elements accordingly.

The monitoring may be performed by a control channel monitoring processor.

According to a fourth aspect of the present invention, the object is accomplished by a computer program product comprising computer-executable components which perform, when the program is run on a computer: allocating a time slot of a communication protocol to a user equipment for data transmission based on received control data of the same or another user equipment in a current time slot and received user data of the same or another user equipment in a preceding time slot, while ignoring user data of the same or any other user equipment received in the current time slot; allocating a frequency resource within the allocated time slot to the user equipment; and allocating signaling resources on a control channel for the submission of control information to the user equipment, which informs of the allocated time slot as well as of the allocated frequency resource.

Modifications of the fourth aspect may be as follows.

The computer program product according to the fourth aspect may be configured to be suitable for providing a communication resource allocation strategy.

The computer program product may be embodied as a computer-readable storage medium.

Otherwise, modifications of the fourth aspect may correspond to the modifications of the third aspect.

According to a fifth aspect of the present invention, the object is accomplished by a system constituting an evolved Node B, comprising an apparatus according to the first aspect or any if its modifications.

The system according to the fifth aspect may be configured to be suitable for providing a communication resource allocation strategy.

It is to be understood that any of the above modifications can be applied singly or in combination to the respective aspects to which they refer, unless they are explicitly stated as excluding alternatives.

BRIEF DESCRIPTION OF THE DRAWINGS

These and other objects, features, details and advantages will become more fully apparent from the following detailed description of the preferred embodiments which is to be taken in conjunction with the appended drawings, in which.

DETAILED DESCRIPTION OF PREFERRED EMBODIMENTS

In the following, description is made to what are presently considered to be preferred embodiments of the present invention. It is to be understood, however, that the description is given by way of example only, and that the described embodiments are by no means to be understood as limiting the present invention thereto.

For example, for illustration purposes, in the following exemplary embodiments, a communication resource allocation strategy in a 3GPP LTE communication network is described. However, it should be appreciated that these exemplary embodiments are not limited for use among these particular types of wireless communication systems, and according to further exemplary embodiments, the present invention may be applied also to other types of communication systems and access networks such as e.g. to WLAN (wireless local area network) and WIMAX (worldwide interoperability for microwave access) techniques and standards.

Thus, certain embodiments of the present invention relate to mobile wireless communication systems, such as 3GPP LTE. In more detail, certain embodiments of the present invention are related to resource allocation in base stations such as an evolved Node B.

However, as indicated above, the present invention is not limited to an evolved Node B, but other embodiments of the present invention are related to general nodes with resource allocation capabilities.

Figure 4:
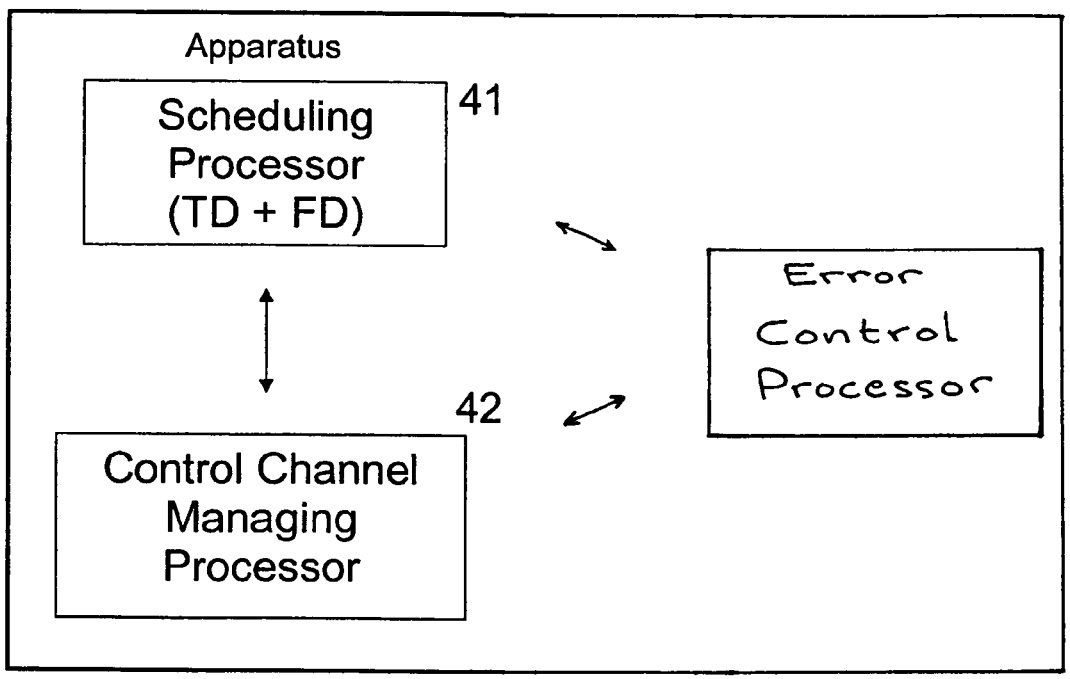
FIG. 4 shows a principle configuration of an apparatus according to certain embodiments of the present invention.

FIG. 4 shows a principle configuration of an apparatus according to certain embodiments of the present invention. That is, as shown in FIG. 4, an apparatus comprises a scheduling processor 41 configured to allocate a time slot of a communication protocol to a user equipment for data transmission based on received control data of the same or another user equipment in a current time slot and received user data of the same or another user equipment in a preceding time slot, while ignoring user data of the same or any other user equipment received in the current time slot, and to allocate a frequency resource to the user equipment; and a control channel managing processor 42 configured to allocate signaling resources on a control channel for the submission of control information to the user equipment, which informs of the time slot allocated by the time domain scheduling processor as well as of the frequency resource allocated by the frequency domain scheduling processor.

Figure 5:
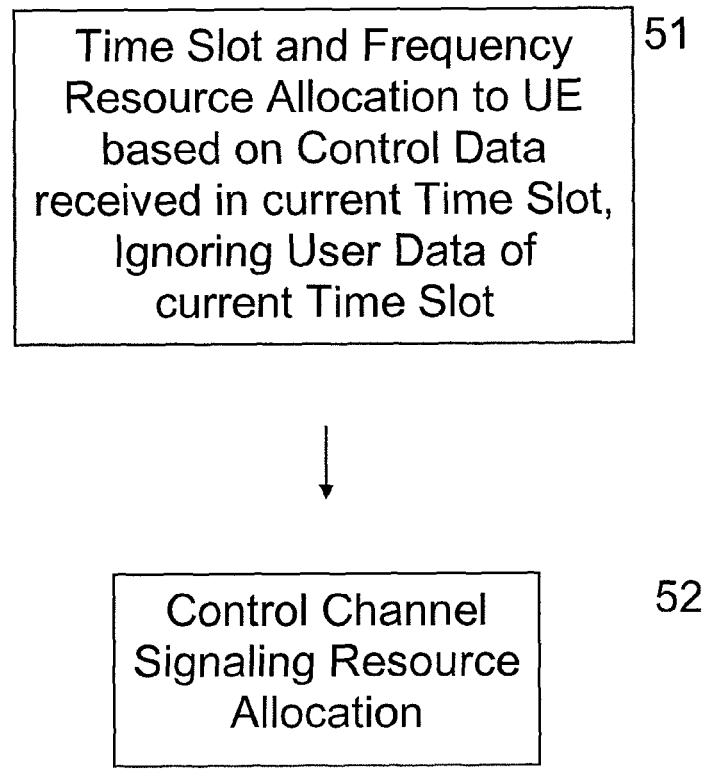
FIG. 5 shows a principle flowchart of a method according to certain embodiments of the present invention.

FIG. 5 shows a principle flowchart of a method according to certain embodiments of the present invention. Specifically, as shown in FIG. 5, a method comprises allocating 51 a time slot of a communication protocol to a user equipment for data transmission based on received control data of the same or another user equipment in a current time slot and received user data of the same or another user equipment in a preceding time slot, while ignoring user data of the same or any other user equipment received in the current time slot; allocating 51 a frequency resource to the user equipment; and allocating 52 signaling resources on a control channel for the submission of control information to the user equipment, which informs of the allocated time slot as well as of the allocated frequency resource. It is to be noted that the order shown in FIG. 5 represents one implementation example. However, other implementation examples are possible and represented by varying the order. That is, the order shown in FIG. 5 is shown for illustration purposes only and not limiting the invention in any way.

The allocating 51 a time slot may be performed by a scheduling processor 41, and the allocating 51 a frequency resource may be performed by the scheduling processor 41, while the allocating 52 signaling resources may be performed by a control channel managing processor 42. According to certain embodiments of the present invention it is thus possible to avoid that a sequential processing of the scheduling and managing tasks requires a very high processing capability due to the fact that the scheduler does not need as input the information whether the latest uplink Hybrid Automatic Repeat Request has been successful or not.

Figures 1, 2:
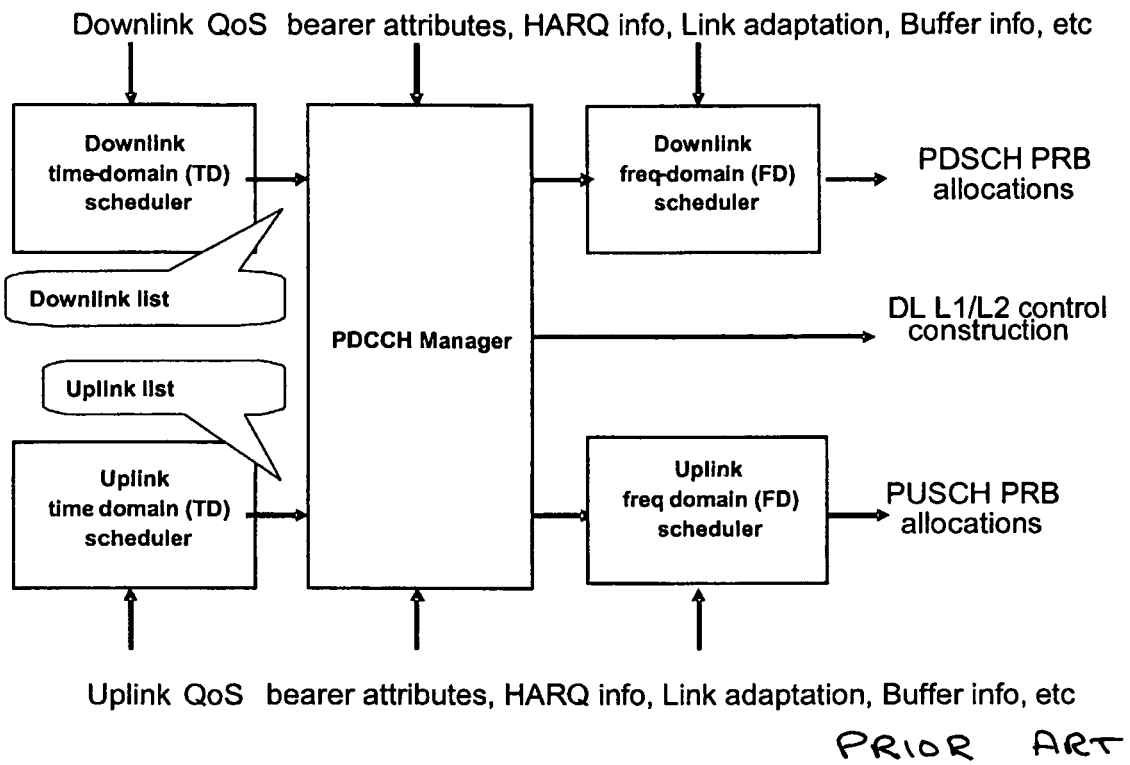
FIG. 1 shows an example of a packet scheduler framework for joint scheduling of UL and DL resources according to LTE.
FIG. 2 shows table 9.1.1-1 of specification TS 36.213 of the 3GPP to illustrate positions of the search space in PDCCH.
Figure 3:
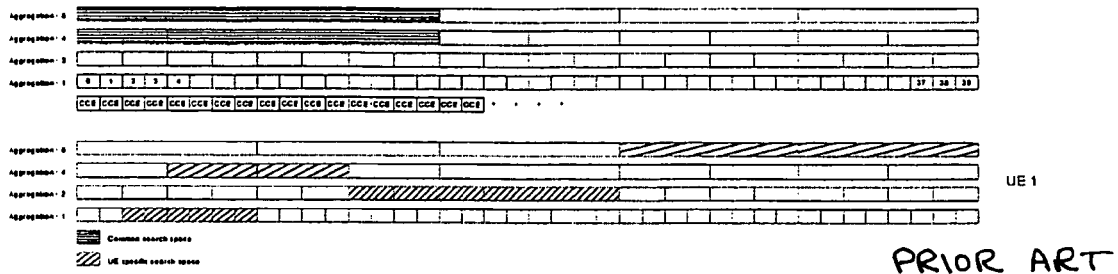
FIG. 3 shows an example of the common search space and the UE specific search space in PDCCH.

Specifically, this information would only be available when the uplink data has been fully decoded. After the decoding the different steps described above in connection with FIG. 1 have to be processed and then finally the PDCCH and PDSCH coding can be carried out. However, the 3GPP protocols have been designed for minimum latency and therefore all these steps have to be performed in such a way that the HARQ indication and the corresponding UL resource allocation has to be done in sub-frame i+4 given that the uplink data have been sent in sub-frame i (see 3GPP TS 35.213). This means that the eNB processing time including the propagation delays over the radio interface is limited to around 3 ms.

Although this description relates to FDD mode, respectively the same applies to TDD mode.

Figure 6:
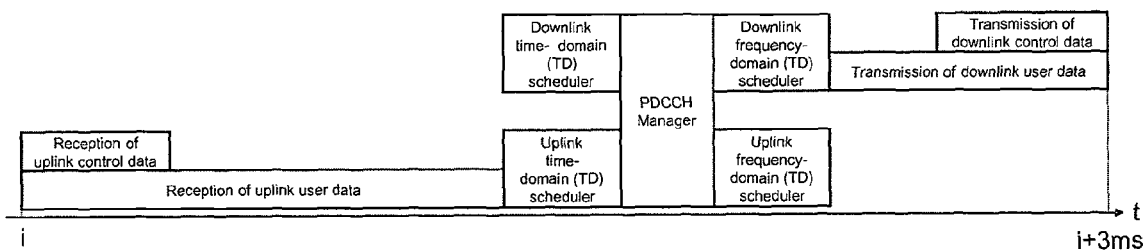
FIG. 6 shows a high level timing diagram of an ideal scheduling/PDCCH managing scheme.

FIG. 6 illustrates the basic timing diagram for the complete eNB processing, showing a high level timing diagram of the ideal scheduling/PDCCH management scheme.

In detail, the first step is the reception of the uplink control and user data. The uplink control data like the HARQ ACK/NACK indication for the previously sent downlink data or the CQI are either sent over the PUSCH or over the PUCCH and are input for the downlink scheduler. On the other hand, the uplink user data are sent over the PUSCH and have to be received completely, i.e. including demodulation, SCFDMA processing, de-interleaving, decoding, for example, in order to know whether the uplink data have been received correctly or incorrectly. Typically, this decoding step takes quite some time due to the computational complexity thereof. Another factor is that the eNB will have to either (1) decode the full bandwidth for a single UE, or (2) decode a full set of minor UL allocations for a set of scheduled UEs. In the end, the eNB will have to be able to decode for the full reception bandwidth (full load). Thus, it is to be noted that it also might be that not a single UE puts the hardware to the limit processing-wise, but rather the process of having multiple UEs scheduled at the same time. Further, if the data have not been received correctly, they have to be scheduled for retransmission exactly 8 sub-frames later, since the uplink transmission is based on a synchronous HARQ. Therefore, the uplink scheduler has to work sequentially to the reception of uplink user data. After the time-domain DL and UL scheduling the PDCCH manager will allocate the appropriate resources on the PDCCH for the signaling of the DL and UL resource allocations. Then, the DL and UL frequency domain schedulers will allocate the DL and UL frequency resources. After this step the DL user data processing such as coding, interleaving, OFDM processing and modulation can start. In addition, the DL control data for the PDCCH and the PHICH will be generated. From FIG. 6 it is apparent that the critical processing path is the decoding of uplink user data, the uplink time domain scheduling, the PDCCH management, the DL frequency domain processing and the transmission of downlink user data.

Hence, this puts tight timing requirements on the processing in the eNB which has the drawback that additional processing power is needed which leads to a more expensive equipment. Furthermore, this will also make it more complex to do a SW based implementation on a digital signal processor, which has clear advantages for using one baseband processing hardware solution for different radio standards like WCDMA, WiMAX, GSM and LTE. Therefore, this ideal scheme cannot be implemented on cost-efficient and flexible hardware.

According to certain embodiments of the present invention, it can be achieved that these drawbacks are avoided and that the above described tight constraints are relieved, allowing more flexible and cost efficient implementations.

Figure 7:
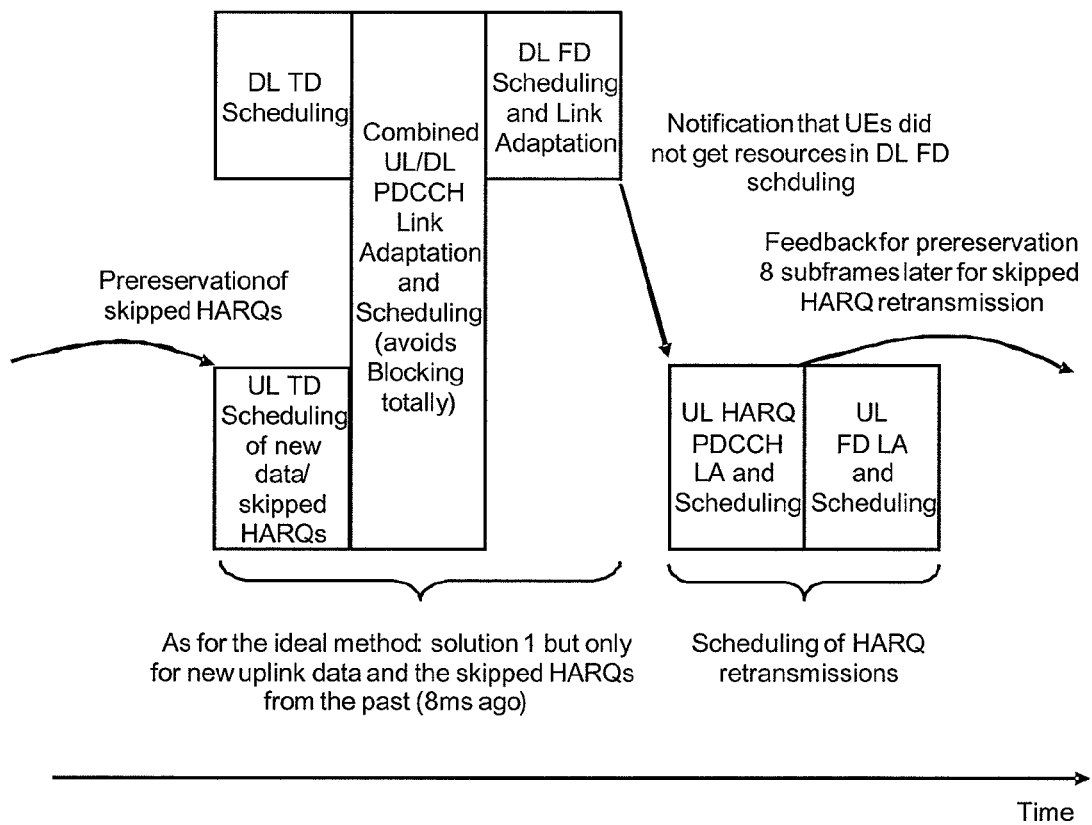
FIG. 7 shows a revised architecture according to certain embodiments of the present invention.
Figure 8:
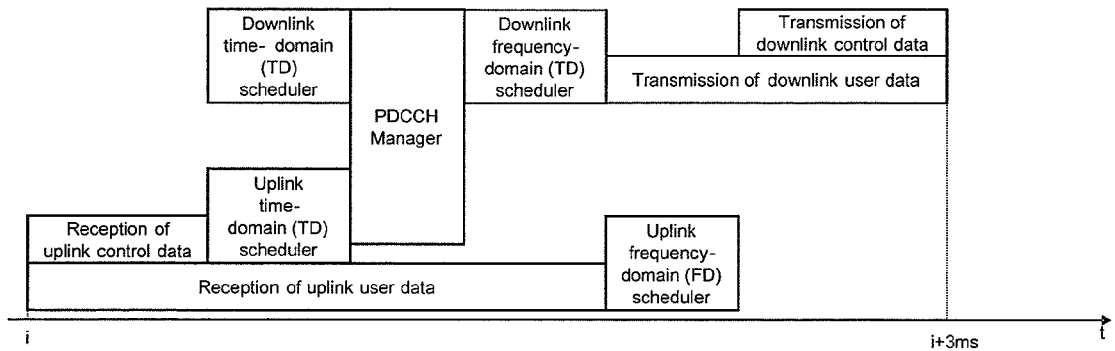
FIG. 8 shows a high level timing diagram according to the revised architecture shown in FIG. 7.

According to certain embodiments of the present invention, the above described different processing steps are rearranged as follows. FIG. 7 shows a revised architecture according to certain embodiments of the present invention relating to such a rearrangement, while FIG. 8 shows a high level timing diagram according to the revised architecture shown in FIG. 7. The following description refers to FIGS. 7 and 8.

The uplink HARQ retransmissions in the TD scheduling and PDCCH allocation steps are ignored, and optionally some resources on PDCCH can be reserved for the HARQ retransmissions, for example in the manner as described further below. Thus, the uplink scheduler considers only initial transmissions and pending "old" HARQ retransmission that have been skipped 8 sub-frames ago.

This has the advantage that the scheduling can start earlier when the UL control information from PUCCH/PUSCH has been decoded, the processing requirements are relaxed, and the usage of more complex scheduling and allocation algorithms is enabled.

Thereafter, the DL frequency domain scheduler allocates DL resources in the frequency domain and passes the information which UE finally got resources to the PDCCH allocation for UL HARQ retransmissions (next step) such that those resources can be removed from the PDCCH allocation. This improves the efficiency of the resource utilization, and the processing of data for DL transmission can be started immediately when the DL FD scheduling has finished. Also this step contributes to a relaxation of processing requirements and to an enablement of the usage of more complex scheduling and allocation algorithms.

Finally, the uplink HARQ retransmissions will be scheduled on the PDCCH in the next step when the HARQ ACK/NACK information becomes available, taking into account the UE allocations from the DL FD scheduler, i.e. PDCCH allocations for DL UE that got no resources will be removed, using one or more of the following rules:

1) Free PDCCH resources from UE that did not get resources in DL FD scheduling;
2) If free PDCCH resources can be used for the HARQ retransmission and the maximum number of UL UE per TTI has not been reached then attempt to allocate those PDCCH resources for UL HARQ retransmissions;
3) Use of pre-reserved CCE resources from the common or dedicated search space resources that have been kept free in the first PDCCH allocation step
4) If this fails, check whether one or several UL UE PDCCH allocation(s) can be replaced by the HARQ retransmission and allocate the corresponding PDCCH resources; and
5) If this also fails, skip UL HARQ retransmission and do a pre-reservation of the UL HARQ retransmission 8 TTI later in the UL TD scheduler (HARQ with adaptive retransmission has to be used).

This rearrangement may thus allow for an optimum resource allocation on PDCCH and UL scheduler, while there is only a small probability that some HARQ will be delayed by one HARQ cycle. Though, the delay will be not more, since then they can get guaranteed resources. In addition, the above described rearrangement scheme also provides some processing room for using more advanced scheduling and allocation algorithms.

Certain embodiments of the present invention comprising one or more features of the rearrangement scheme described above in connection with FIGS. 7 and 8 can be implemented by appropriate SW on the baseband processing unit inside of a base station such as an eNB in LTE, thus enabling the processing flow of FIG. 8.

According to the above description, an advantage is that the reception of uplink user data has much longer time and therefore the critical timing path for the complete processing chain relaxes very much. Thus, the reduced HW processing requirements enable a cost optimized implementation, a SW based processing becomes feasible, and it is enabled for implementing different radio standards like WCDMA, LTE, WiMAX or GSM/EDGE on the same HW platform. In addition, the reduced processing requirements enable more complex and performance oriented scheduling and link adaptation algorithms.

Figure 9:
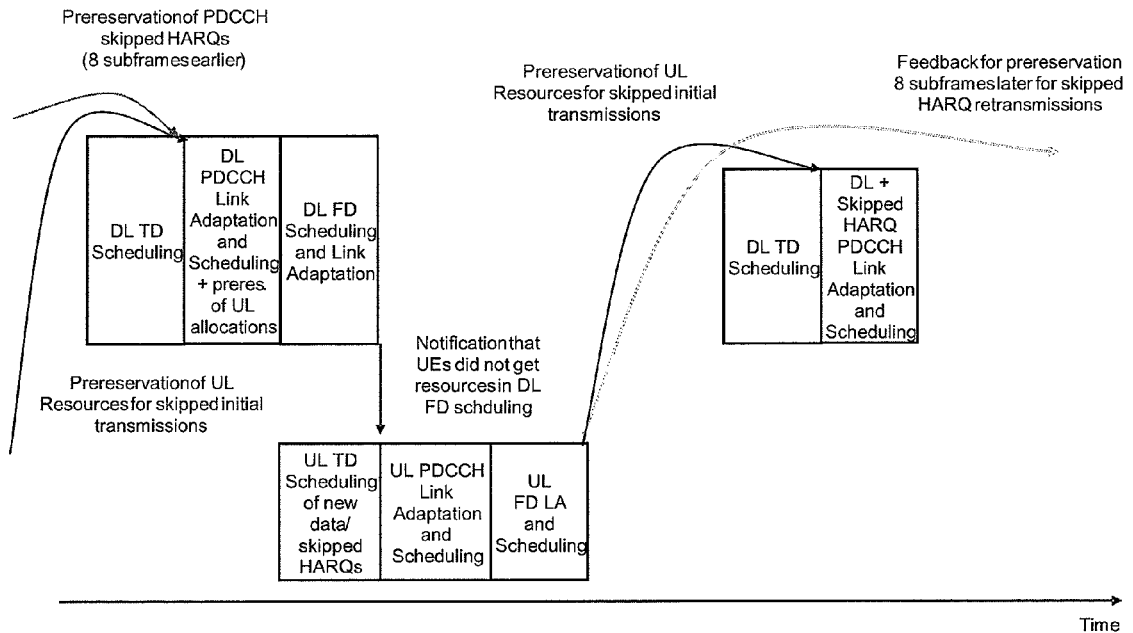
FIG. 9 shows a revised architecture according to certain further embodiments of the present invention.
Figure 10:
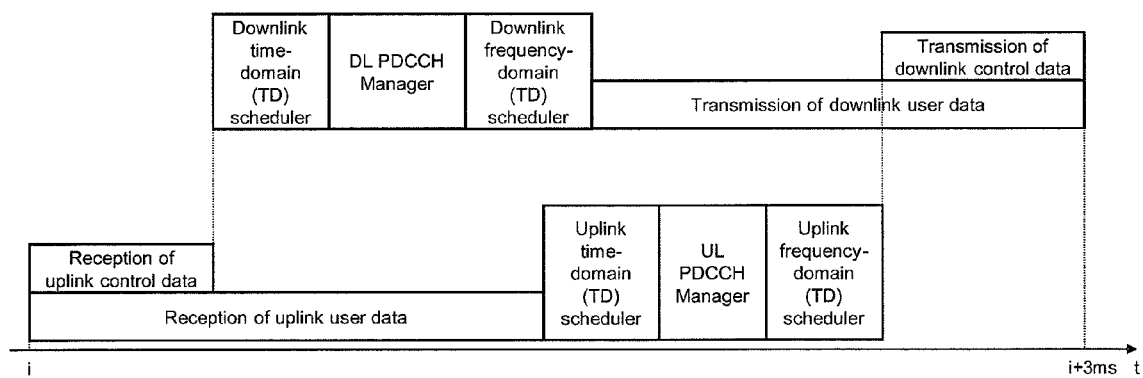
FIG. 10 shows a high level timing diagram according to the revised architecture shown in FIG. 9.

According to further certain embodiments of the present invention, FIGS. 9 and 10 show an alternative rearrangement.

Specifically, FIGS. 9 and 10 show separated and not time aligned PDCCH allocations for UL and DL which can also relax timing and processing requirements. Further, the DL PDCCH allocation takes into account feedback from previous scheduling times such as the HARQ transmissions which were skipped 8 sub-frames ago, which provides a guaranteed service for the next HARQ retransmissions which limits the maximum delays. In addition, the DL PDCCH allocation takes into account feedback from the previous sub-frame for blocked initial UL transmissions to do a pre-reservation of resources by either a general reservation that reduces the amount of DL reservation when a high number of UL initial transmissions have been blocked in the previous interval, or a specific reservation by assuming that the UEs that have been blocked will also be selected in the following sub-frame for transmission.

This balances the PDCCH blocking between UL and DL allocations and avoids unfairness between UL and DL which would occur when this would not be done, since DL is processed before UL.

A further improvement can be done when the PDCCH allocation and the DL FD scheduling are handled jointly within one step, meaning that when the FD scheduler selects a new UE for scheduling the PDCCH allocation for this UE is done and if the PDCCH resources are not available then the UE is skipped by the FD scheduler.

Hereinafter, still further certain embodiments of the present invention are described with a focus on the following.

As described above, a problem arises in connection with scheduling of UE for UL data, since the eNB scheduler has to make centralized decisions on which UE are about to be scheduled. Due to timing and processing limitations in hardware, it is difficult to schedule and test for CCE capacity for all three types of traffic that will be handled by the PDCCH scheduler, i.e. (a) DL traffic, (b) UL traffic, new transmissions, and (c) UL traffic, HARQ retransmissions.

Accordingly, there are three conditions that should preferably be fulfilled at the same time, which are:
1) Sufficient time to do forward error correction (FEC) coding of the DL data channel—this is needed to have proper protection and error correction to combat the frequency selective radio channel.
2) Sufficient time to create and encode the needed allocation information signaling (building the PDCCH).
3) Sufficient time to do decoding of the received UL data packet and create an indication of whether the UL packet should be retransmitted by the UE, or whether the UE should provide new data packets.

There is a problem in that these requirements are pulling in different ways, and it is presently difficult to have the UL data packet decoded in time for when it is planned to create the joint scheduling decision as already described above. That is, the FEC decoding takes time due to the several turbo decoding iterations needed for proper detection performance. Due to the processing delay, it is difficult to have the knowledge available in due time for the assignment of the PDCCH and CCE resources.

Therefore, certain still further embodiments comprise a feature to introduce a set of reserved UL resources for the later UL HARQ users.

Figure 11:
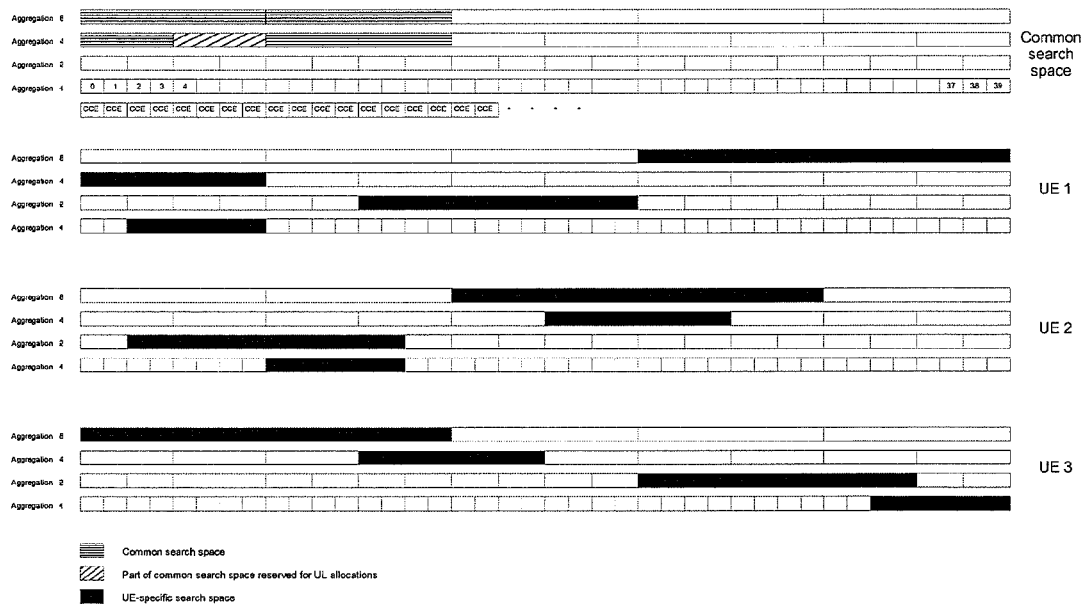
FIG. 11 shows an exemplary CCE reservation within the CSS of PDCCH for UE uplink retransmissions according to certain still further embodiments of the present invention.

The reserved resources can be placed on CCE that are defined within the common search space. For example, 4 CCE are reserved at aggregation level 4 which are not available for scheduling by other UE. This example is shown in FIG. 11 illustrating an exemplary CCE reservation within the CSS of PDCCH for UE uplink retransmissions according to certain still further embodiments of the present invention. In the upper part of FIG. 11 the CSS is depicted where the horizontal and vertical lines indicate the conventional common search space, while the vertical lines at the second position of aggregation level 4 indicate the part of the common search space reserved for UL retransmissions. The lower rows depict respective UE specific search spaces of user equipment UE 1 to UE 3. These example UE specific search spaces are marked by black blocks in FIG. 11.

Accordingly there is room for scheduling HARQ retransmissions at the later stage without having to force a blocking of scheduled UE. If a UE is in such condition that it is operating at aggregation level 2, it is then possible to just schedule at a higher aggregation level than needed and thereby ensure that the allocation information is provided for the UE. As this scheduling at higher aggregation level would provide more resources on the radio channel, the corresponding code rate will be lower, and the probability of the scheduled UE receiving the PDCCH correctly increases correspondingly.

As the number of retransmissions for UL data will heavily depend on the number of scheduled UL users, for some situations it is preferred to reserve more CCE for the UL allocations. For example, it may be preferred to reserve two or three of the common search space entries at aggregation level 4 to be able to handle the risk of many users requiring scheduled retransmissions. Additionally, for the case where UE in poor condition are scheduled, it may also be preferred to have the reservation in CCE domain as well as in the power domain. That is, in case a UE is scheduled using aggregation level 8, either (1) an entry at aggregation level 8 is reserved for potential retransmission, which also holds two entries at aggregation level 4, or (2) an opening at aggregation level 4 is reserved, but the power is reserved as if a 3 dB boosting is used for this UE, which effectively corresponds to use aggregation level 8. The latter approach can be achieved by reserving CCE resources outside the common search space.

According to certain embodiments of the present invention, not only using a pre-reservation for these potential retransmissions may be performed, but this reservation can also be made dynamic according to the knowledge of scheduling history.

That is, as the eNB scheduler knows how many UL UE were scheduled 8 TTI ago, and at which aggregation and power levels, the expected number of PDCCH common search space resources can be derived and/or estimated.

In addition, an option is to introduce an "outer-loop" algorithm on top of the dynamic algorithm, which monitors the amount of PDCCH common search space resources that were reserved as well as the amount of resources actually used for scheduling retransmissions. In this way, a system is achieved that adjusts the resource utilization to the needs.

According to these embodiments, the scheduling complexity will increase due to the PDCCH scheduling to be run twice with the second time potentially with fewer options to explore, as some are already taken. Though, there is a major advantage that a better utilization of the CCE resources is obtained and that it is enabled to schedule more users for UL traffic.

As indicated above, it is considered that certain embodiments of the present invention can advantageously be applied to 3GPP based environments such as a LTE compliant eNB product.

According to the above description, it should thus be apparent that exemplary embodiments of the present invention provide, for example from the perspective of a network element such as an evolved Node B, or a component thereof, an apparatus embodying the same, a method for controlling and/or operating the same, and computer program(s) controlling and/or operating the same as well as mediums carrying such computer program(s) and forming computer program product(s).

For example, described above are apparatuses, methods and computer program products capable of providing a communication resource allocation strategy. Specifically, a scheduling processor allocates a time slot of a communication protocol to a user equipment for data transmission based on received control data of the same or another user equipment in a current time slot and received user data of the same or another user equipment in a preceding time slot, while ignoring user data of the same or any other user equipment received in the current time slot. The scheduling processor also allocates a frequency resource to the user equipment. A control channel managing processor allocates signaling resources on a control channel for the submission of control information to the user equipment, which informs of the time slot allocated by the time domain scheduling processor as well as of the frequency resource allocated by the frequency domain scheduling processor.

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

What is described above is what is presently considered to be preferred embodiments of the present invention. However, as is apparent to the skilled reader, these are provided for illustrative purposes only and are in no way intended that the present invention is restricted thereto. Rather, it is the intention that all variations and modifications be included which fall within the spirit and scope of the appended claims.

The invention claimed is:

1. An apparatus, comprising:
a scheduling processor configured to allocate a time slot of a communication protocol to a user equipment for data transmission based on received control data of the same or another user equipment in a current time slot and received user data of the same or another user equipment in a preceding time slot, while ignoring user data of the same or any other user equipment received in the current time slot, and to allocate a frequency resource to the user equipment; and
a control channel managing processor configured to allocate signaling resources on a control channel for the submission of control information to the user equipment, which informs of the time slot allocated by the scheduling processor as well as of the frequency resource allocated by the scheduling processor.

2. The apparatus according to claim 1, wherein the scheduling processor comprises a time domain scheduling processor configured to allocate the time slot and a frequency domain scheduling processor configured to allocate the frequency resource.

3. The apparatus according to claim 2, wherein the frequency domain scheduling processor is further configured to allocate the frequency resource within the time slot allocated by the time domain scheduling processor.

4. The apparatus according to claim 1, further comprising:
an error control processor configured to determine correct receipt of user data transmitted by the same or another user equipment and to respectively confirm a status of the correct receipt of user data to the same or the another user equipment.

5. The apparatus according to claim 4, wherein the scheduling processor is further configured to allocate a time slot of a communication protocol to the user equipment for data transmission based on receipt of user data of the user equipment in a preceding time slot, which user data is determined by the error control processor to be incorrectly received.

6. The apparatus according to claim 2, wherein
the time domain scheduling processor comprises a downlink time domain scheduling processor configured to allocate a downlink time slot of a communication protocol to a user equipment for data transmission and an uplink time domain scheduling processor configured to allocate an uplink time slot of a communication protocol to a user equipment for data transmission,
the control data are uplink control data and the user data are uplink user data,
the frequency domain scheduling processor comprises a downlink frequency domain scheduling processor configured to allocate a downlink frequency resource within the allocated downlink time slot and an uplink frequency domain scheduling processor configured to allocate an uplink frequency resource within the allocated uplink time slot,
the downlink frequency domain scheduling processor is further configured to allocate the downlink frequency resource within the allocated downlink time slot in response to the allocation of signaling resources by the control channel managing processor, and
the uplink frequency domain scheduling processor is further configured to allocate the uplink frequency resource within the allocated uplink time slot in response to a completed receipt of uplink user data of the same or another user equipment received in the current time slot.

7. The apparatus according to claim 6, wherein the uplink frequency domain scheduling processor is further configured
to determine whether the control channel managing processor allocated a signaling resource to the user equipment, but at the same time the downlink frequency domain scheduling processor did not allocate a downlink frequency resource within the allocated downlink time slot to the user equipment,
to control removal of the signaling resource allocation, and
to allocate the removed signaling resource as uplink frequency resource to the another user equipment.

8. The apparatus according to claim 2, wherein
the time domain scheduling processor comprises a downlink time domain scheduling processor configured to allocate a downlink time slot of a communication protocol to a user equipment for data transmission and an uplink time domain scheduling processor configured to allocate an uplink time slot of a communication protocol to a user equipment for data transmission,
the control data are uplink control data and the user data are uplink user data,
the frequency domain scheduling processor comprises a downlink frequency domain scheduling processor configured to allocate a downlink frequency resource within the allocated downlink time slot and an uplink frequency domain scheduling processor configured to allocate an uplink frequency resource within the allocated uplink time slot,
the control channel managing processor comprises a control channel downlink managing processor configured to allocate signaling resources on the control channel for the submission of downlink control information to the user equipment, which informs of the downlink time slot allocated by the downlink time domain scheduling processor as well as of the downlink frequency resource allocated by the downlink frequency domain scheduling processor, and a control channel uplink managing processor configured to allocate signaling resources on the control channel for the submission of uplink control information to the user equipment, which informs of the uplink time slot allocated by the uplink time domain scheduling processor as well as of the uplink frequency resource allocated by the uplink frequency domain scheduling processor, the downlink time domain scheduling processor is further configured to allocate the downlink time slot of a communication protocol to the user equipment for data transmission based on received control data of the same or another user equipment in a current time slot and received user data of the same or another user equipment in a preceding time slot, while ignoring user data of the same or any other user equipment received in the current time slot, the uplink time domain scheduling processor is further configured to allocate the uplink time slot of a communication protocol to the user equipment for data transmission in response to a completed receipt of uplink user data of the same and any other user equipment received in the current time slot, the control channel downlink managing processor is further configured to allocate signaling resources on the control channel for the submission of downlink control information to the user equipment in response to the allocation of the downlink time slot by the downlink time domain scheduling processor, the control channel uplink managing processor is further configured to allocate signaling resources on the control channel for the submission of uplink control information to the user equipment in response to the allocation of the uplink time slot by the uplink time domain scheduling processor, the downlink frequency domain scheduling processor is further configured to allocate the downlink frequency resource within the allocated downlink time slot in response to the allocation of signaling resources by the control channel downlink managing processor, and the uplink frequency domain scheduling processor is further configured to allocate the uplink frequency resource within the allocated uplink time slot in response to the allocation of signaling resources by the control channel uplink managing processor.

9. The apparatus according to claim 8, further comprising:

an error control processor configured to determine correct receipt of uplink user data transmitted by the user equipment and to confirm a status of the correct receipt of the uplink user data to the user equipment, wherein the control channel downlink managing processor is further configured to reserve signaling resources on the control channel for the submission of control information to the user equipment concerning a retransmission of the uplink user data for the case that the uplink user data is determined by the error control processor to be incorrectly received.

10. The apparatus according to claim 2, wherein the control channel managing processor and the frequency domain scheduling processor are further configured to be in operable connection with each other, the control channel managing processor is further configured to allocate signaling resources on the control channel to the user equipment before the frequency domain scheduling processor can allocate a frequency resource to the user equipment, and the frequency domain scheduling processor is further configured to skip allocation of a frequency resource to the user equipment if no signaling resources on the control channel are allocated by the control channel managing processor to the user equipment.

11. The apparatus according to claim 1, further comprising:

an error control processor configured to determine correct receipt of user data transmitted by the user equipment and to confirm a status of the correct receipt of the user data to the user equipment, wherein the control channel managing processor is further configured to map the control channel for the submission of control information to the user equipment onto a plurality of control channel elements, the plurality of control channel elements is separated into a user equipment specific search space comprising such control channel elements carrying control information which is specific for read-out by the user equipment and into a common search space comprising such control channel elements carrying control information which can be commonly read-out by all user equipment listening to the control channel, and the control channel managing processor is further configured to reserve a number of control channel elements in the common search space for the submission of control information to the user equipment concerning a retransmission of the uplink user data for the case that the uplink user data is determined by the error control processor to be incorrectly received.

12. The apparatus according to claim 11, wherein an aggregation level is defined by the combination of one or more control channel elements for carrying a related amount of interrelated control information, where a higher aggregation level designates more combined control channel elements, and the control channel managing processor is further configured to select an aggregation level for the reservation in the common search space based on a data transmission history comprising one or more of a group including a number of user equipment to which resources were allocated in a selected preceding time slot, an aggregation level used for the submission of control information to the user equipment, and a power level used for the submission of control information to the user equipment.

13. The apparatus according to claim 11, further comprising:

a monitoring controller configured to monitor the number of control channel elements in the common search space for the submission of control information to the user equipment reserved by the control channel managing processor as well as the number of these reserved control channel elements in the common search space which are actually used, and to command the control channel managing processor to adapt the number of reserved control channels elements accordingly.

14. A method, comprising:

allocating a time slot of a communication protocol to a user equipment for data transmission based on received control data of the same or another user equipment in a current time slot and received user data of the same or another user equipment in a preceding time slot, while ignoring user data of the same or any other user equipment received in the current time slot;

allocating a frequency resource to the user equipment; and allocating signaling resources on a control channel for the submission of control information to the user equipment, which informs of the allocated time slot as well as of the allocated frequency resource.

15. The method according to claim 14, wherein the time slot is allocated by a time domain scheduling processor and the frequency resource is allocated by a frequency domain scheduling processor.

16. The method according to claim 14, wherein the allocating a frequency resource includes allocating a frequency resource within the allocated time slot.

17. The method according to claim 14, further comprising:
    determining correct receipt of user data transmitted by the same or another user equipment; and
    respectively confirming a status of the correct receipt of user data to the same or the another user equipment.

18. The method according to claim 17, further comprising: allocating a time slot of a communication protocol to the user equipment for data transmission based on receipt of user data of the user equipment in a preceding time slot, which user data is determined to be incorrectly received.

19. The method according to claim 14, wherein
    the allocating a time slot comprises allocating a downlink time slot of a communication protocol to a user equipment for data transmission and allocating an uplink time slot of a communication protocol to a user equipment for data transmission,
    the control data are uplink control data and the user data are uplink user data, and
    the allocating a frequency resource comprises allocating a downlink frequency resource within the allocated downlink time slot and allocating an uplink frequency resource within the allocated uplink time slot; further comprising:
    allocating the downlink frequency resource within the allocated downlink time slot in response to the allocating of signaling resources; and
    allocating the uplink frequency resource within the allocated uplink time slot in response to a completed receipt of uplink user data of the same or another user equipment received in the current time slot.

20. The method according to claim 19, further comprising:
    determining whether a signaling resource is allocated to the user equipment, but at the same time no downlink frequency resource within the allocated downlink time slot is allocated to the user equipment;
    controlling removal of the signaling resource allocation; and
    allocating the removed signaling resource as uplink frequency resource to the another user equipment.

21. The method according to claim 14, wherein
    the allocating a time slot comprises allocating a downlink time slot of a communication protocol to a user equipment for data transmission and allocating an uplink time slot of a communication protocol to a user equipment for data transmission,
    the control data are uplink control data and the user data are uplink user data,
    the allocating a frequency resource comprises allocating a downlink frequency resource within the allocated downlink time slot and allocating an uplink frequency resource within the allocated uplink time slot, and
    the allocating signaling resources comprises allocating signaling resources on the control channel for the submission of downlink control information to the user equipment, which informs of the allocated downlink time slot as well as of the allocated downlink frequency resource, and allocating signaling resources on the control channel for the submission of uplink control information to the user equipment, which informs of the allocated uplink time slot as well as of the allocated uplink frequency resource; further comprising:
    allocating the downlink time slot of a communication protocol to the user equipment for data transmission based on received control data of the same or another user equipment in a current time slot and received user data of the same or another user equipment in a preceding time slot, while ignoring user data of the same or any other user equipment received in the current time slot;
    allocating the uplink time slot of a communication protocol to the user equipment for data transmission in response to a completed receipt of uplink user data of the same and any other user equipment received in the current time slot;
    allocating signaling resources on the control channel for the submission of downlink control information to the user equipment in response to the allocating of the downlink time slot;
    allocating signaling resources on the control channel for the submission of uplink control information to the user equipment in response to the allocating of the uplink time slot;
    allocating the downlink frequency resource within the allocated downlink time slot in response to the allocating of signaling resources; and allocating the uplink frequency resource within the allocated uplink time slot in response to the allocating of signaling resources.

22. The method according to claim 21, further comprising:
    determining correct receipt of uplink user data transmitted by the user equipment;
    confirming a status of the correct receipt of the uplink user data to the user equipment; and
    reserving signaling resources on the control channel for the submission of control information to the user equipment concerning a retransmission of the uplink user data for the case that the uplink user data is determined to be incorrectly received.

23. The method according to claim 14, further comprising;
    allocating signaling resources on the control channel to a second user equipment before allocating a frequency resource to the second user equipment, and
    skipping allocation of a frequency resource to the second user equipment if no signaling resources on the control channel are allocated to the second user equipment.

24. The method according to claim 14, further comprising:
    determining correct receipt of user data transmitted by the user equipment;
    confirming a status of the correct receipt of the user data to the user equipment;
    mapping the control channel for the submission of control information to the user equipment onto a plurality of control channel elements, wherein the plurality of control channel elements is separated into a user equipment specific search space comprising such control channel elements carrying control information which is specific for read-out by the user equipment and into a common search space comprising such control channel elements carrying control information which can be commonly read-out by all user equipment listening to the control channel; and
    reserving a number of control channel elements in the common search space for the submission of control information to the user equipment concerning a retransmission of the uplink user data for the case that the uplink user data is determined to be incorrectly received.

25. The method according to claim 24, wherein
an aggregation level is defined by the combination of one or more control channel elements for carrying a related amount of interrelated control information, where a higher aggregation level designates more combined control channel elements; further comprising:
selecting an aggregation level for the reserving in the common search space based on a data transmission history comprising one or more of a group including a number of user equipment to which resources were allocated in a selected preceding time slot, an aggregation level used for the submission of control information to the user equipment, and a power level used for the submission of control information to the user equipment.

26. The method according to claim 24, further comprising:
monitoring the number of reserved control channel elements in the common search space for the submission of control information to the user equipment as well as the number of these reserved control channel elements in the common search space which are actually used; and
commanding to adapt the number of reserved control channels elements accordingly.

27. A computer program product comprising a non-transitory computer-readable storage medium bearing computer program code embodied therein for use with a computer, the computer program code comprising:
computer-executable components which perform, when the program is run on a computer:
allocating a time slot of a communication protocol to a user equipment for data transmission based on received control data of the same or another user equipment in a current time slot and received user data of the same or another user equipment in a preceding time slot, while ignoring user data of the same or any other user equipment received in the current time slot;
allocating a frequency resource within the allocated time slot to the user equipment; and
allocating signaling resources on a control channel for the submission of control information to the user equipment, which informs of the allocated time slot as well as of the allocated frequency resource.

28. A system constituting an evolved Node B, comprising an apparatus according to claim 1.

* * * * *